(No Model.)
H. HALL.
STRAIGHT WAY STOP VALVE.
No. 318,894. Patented May 26, 1885.
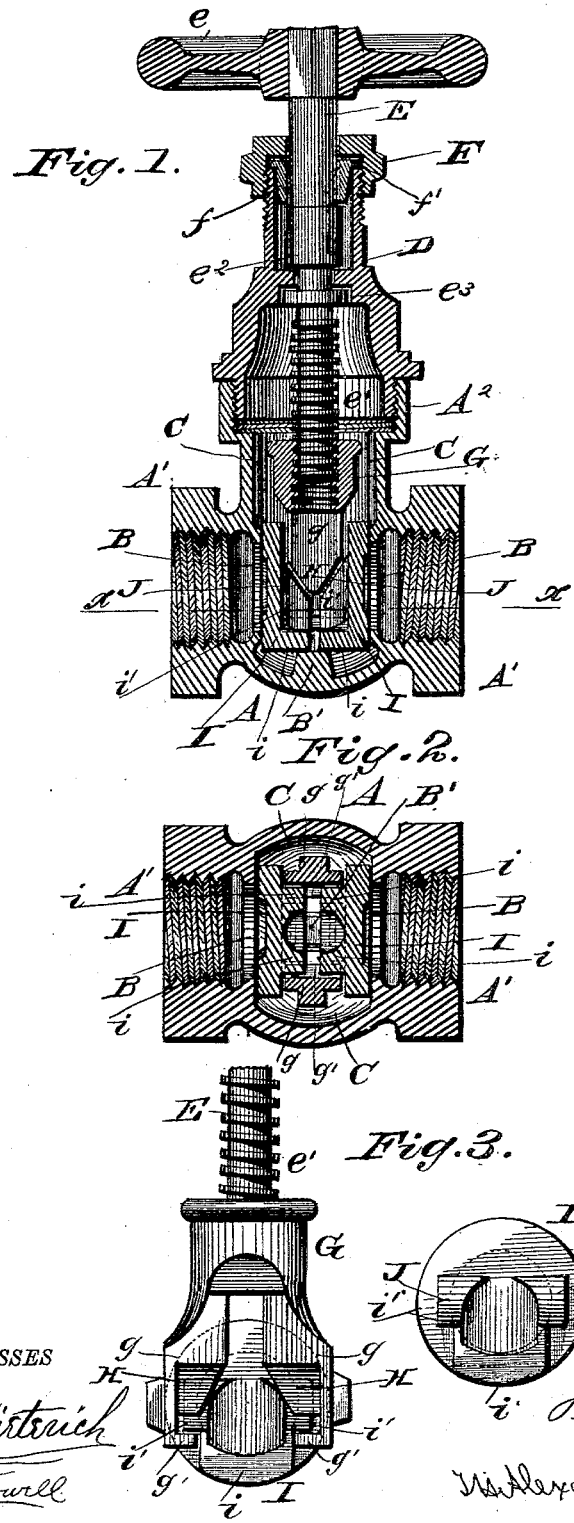
WITNESSES
INVENTOR
Henry Hall

UNITED STATES PATENT OFFICE.

HENRY HALL, OF LANSINGBURG, NEW YORK, ASSIGNOR TO THE RENSSELAER MANUFACTURING COMPANY, OF SAME PLACE.

STRAIGHT-WAY STOP-VALVE.

SPECIFICATION forming part of Letters Patent No. 318,594, dated May 26, 1885.

Application filed February 9, 1885. (No model.)

*To all whom it may concern:*

Be it known that I, HENRY HALL, of Lansingburg, in the county of Rensselaer and State of New York, have invented certain new and useful Improvements in Straight-Way Stop-Valves; and I do hereby declare that the following is a full, clear, and exact description thereof, reference being had to the accompanying drawings, and to the letters of reference marked thereon, which form part of this specification, in which—

Figure 1 is a central vertical section through my improved valve. Fig. 2 is a horizontal section of the same on line $x\ x$, Fig. 1. Fig. 3 is a view of the parts detached.

This invention relates to improvements in straight-way stop-valves, and, while thoroughly effective, is of very simple construction and can be manufactured at small cost.

The invention consists in the construction and novel arrangement of parts hereinafter described, and pointed out in the appended claims.

A represents the T-shaped coupling-piece forming the valve-casing, of which A' A' are the lateral arms, internally threaded to engage the pipes, and $A^2$ is the stem, internally threaded to engage the lower end of the valve-stem sleeve.

B B are the valve-ports, and B' is a stop situated centrally on the interior surface of the globe of the casing, as shown.

C C are similar rectangular recesses made on the inner surface of the stem $A^2$, and situated at right angles to the arms A', their sides being flush with the valve-ports.

D is the sleeve of the valve-stem, with its enlarged lower end threaded to engage in the stem $A^2$ of the casing.

E is the valve-stem, provided with the hand-wheel $e$, to rotate it within the sleeve D, and having its lower portion, $e'$, threaded, to actuate the sleeve-nut hereinafter described. The valve-stem is prevented from moving longitudinally by means of its enlarged portion $e^2$ and the internal flange, $e^3$, on the sleeve D.

F is a nut engaging the threaded upper end of the sleeve D, and $f$ is a collar which enters the said sleeve and has its lower end brought in contact with the upper shoulder of the enlarged portion $e^2$ of the valve-stem by the pressure of the nut F. The upper end of the collar $f$ is provided with the circumferential flange $f'$, which lies upon the upper end of the sleeve D, and forms a washer between the same and the nut F, as shown.

G is the sleeve-nut engaging the threaded lower end of the valve-stem and having its lower end formed into the opposite similar depending arms, $g\ g$, the ends of which are provided with the flanges $g'\ g'$, which stand at right angles inward and support the gates or slides hereinafter described.

H H are similar opposite wedge-shaped lugs formed on the interior surfaces of the arms $g$ with their points downward.

I I are two similar disk-shaped slides or gates, of somewhat larger diameter than the valve-ports, and $i\ i$ are flanges standing at right angles inward from the lower part of the periphery of the same. Each of the said flanges bends vertically upward on each side of the central vertical line of the gate, and has formed upon it the shoulders $i'\ i'$, below and against which the flanges $g'\ g'$ engage. Above the said shoulders the flanges $i$ are beveled upward and outward to the inner surface of the gate to form the edges J, against which the edges of the wedge-shaped lugs H impinge.

When in position, the gates I lie against the opposite edges of the arms $g$, with the flanges $g'$ below the shoulders $i'$. The beveled edges J of the opposite gates have between them V-shaped spaces, into which the wedge-shaped lugs H enter without fitting closely.

The sleeve-nut and gates, when connected, fit loosely in the recesses C C, the edges of the gates being adjacent to the sides of said recesses. The gates are thus prevented from becoming detached from the sleeve-nut, and the latter is prevented from turning with the valve-sleeve; consequently it must travel up and down when the valve-stem is turned.

When the sleeve-nut nearly reaches its lowest part, the flanges $i$ impinge on the stop B', and the further descent of the sleeve-nut forces the lugs H between the beveled edges J and expands the gates apart, so as to bind them against the valve-ports opposite which they then are. As the sleeve-nut rises, the lugs are drawn upward from the beveled edges, and the gates are loosened on the ports and move without friction.

As the gates impinge on the stop in the casing without sliding thereon, they will not wear at their point of contact therewith; consequently, however much the lugs H and beveled edges J may wear, the relative positions of the stop, gates, and ports will not be changed, and the valve will be in working condition.

It is evident from the construction that the gates bind on the ports only when at rest, and consequently move up and down without friction and wear.

Having described my invention, I claim—

1. In a straight-way stop-valve, the combination of the nut G, traveling without rotation on the stem E, and provided with the arms g, having the flanges g' and lugs H, with the gates I, provided with the flanges i, shoulders i', and beveled edges J, the stop B', and valve-ports B, substantially as described.

2. In a straight-way stop-valve, the combination of the valve-casing A, provided with the stop-lug B', situated centrally on the interior surface of its base, and the recesses C C, at right angles to the axis of the ports B B, with the valve-stem E, rotating in the sleeve D, the nut G, traveling on the valve-stem, and provided with the arms g, having upon them the flanges g' g' and lugs H H, and the gates I I, provided with the flanges i i, having the shoulders i' i' and beveled edges J, the parts being so arranged that when the flanges i impinge on the stop-lug B' the lugs H will press outward the edges J and bind the gates on the ports, and before the flanges g' lift the shoulders i' the lugs H will have released the beveled edges and the gates from the ports, substantially as specified.

In testimony that I claim the foregoing as my own I affix my signature in presence of two witnesses.

HENRY HALL.

Witnesses:
E. F. AMES,
MILFORD L. FANCHER.